Nov. 18, 1924.
L. R. GRUSS
1,516,092
FRAME SUSPENSION
Filed Aug. 27, 1919
2 Sheets-Sheet 2
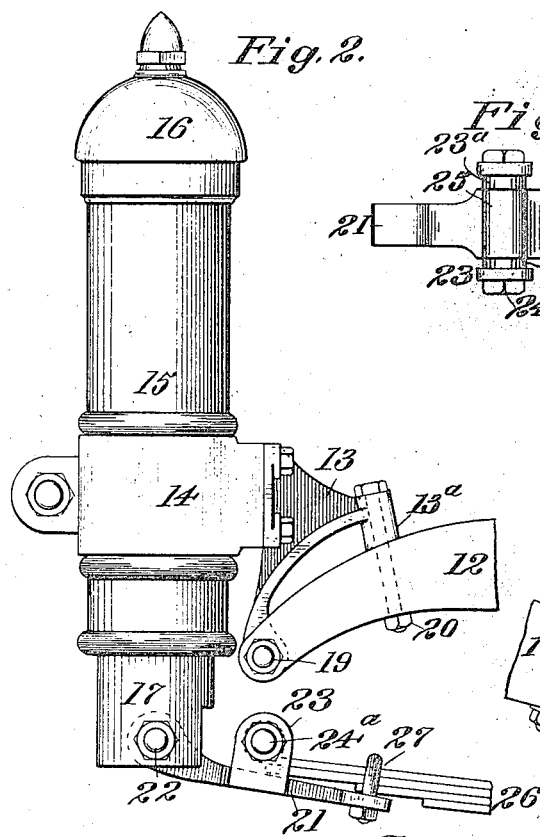
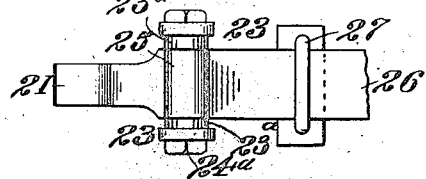
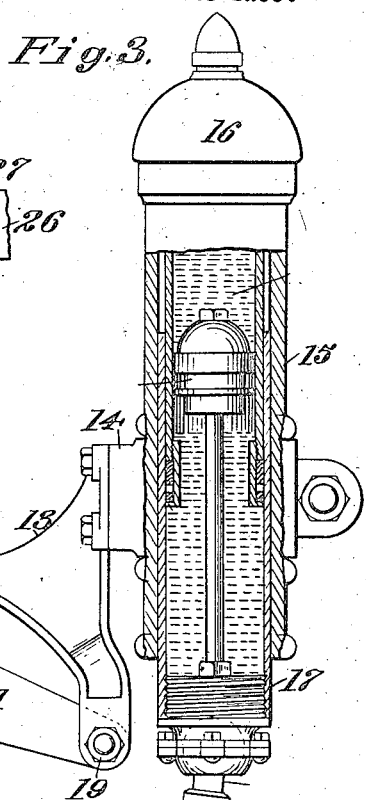
INVENTOR
Lucien R. Gruss,
BY
Strong & Townsend
ATTORNEYS Patented Nov. 18, 1924.

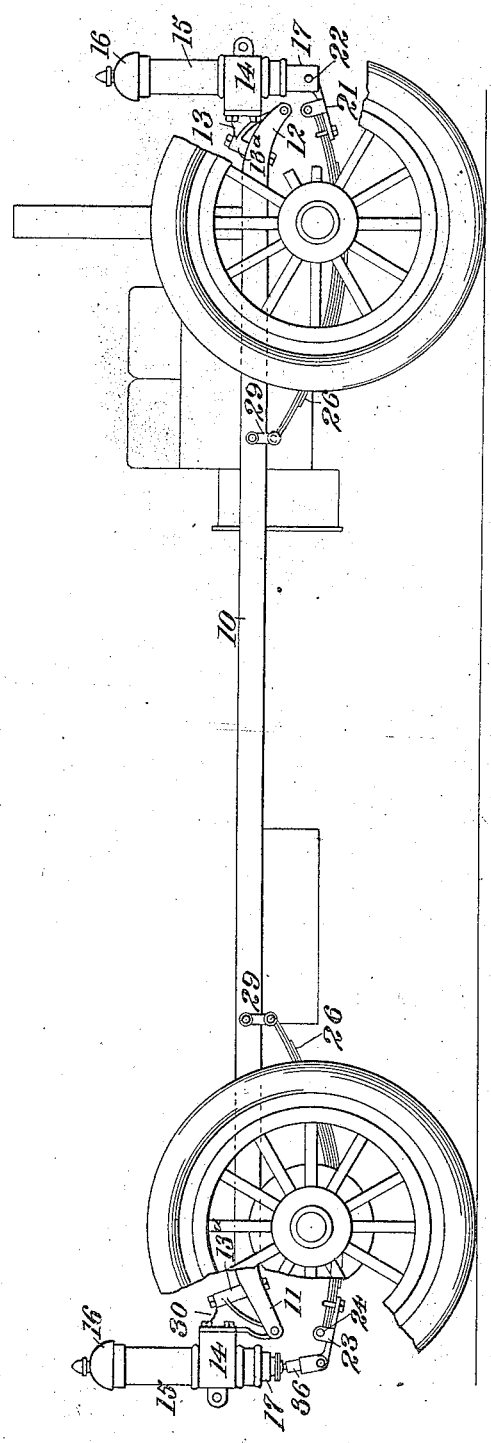

1,516,092

UNITED STATES PATENT OFFICE.

LUCIEN R. GRUSS, OF SAN FRANCISCO, CALIFORNIA, ASSIGNOR TO PNEUMATIC CUSHION CO., OF SAN FRANCISCO, CALIFORNIA, A CORPORATION OF ARIZONA.

FRAME SUSPENSION.

Application filed August 27, 1919. Serial No. 320,227.

*To all whom it may concern:*

Be it known that I, LUCIEN R. GRUSS, a citizen of the United States, residing at the city and county of San Francisco and State of California, have invented new and useful Improvements in Frame Suspensions, of which the following is a specification.

This invention relates to a vehicle construction, and particularly pertains to a spring suspension therefor.

This invention is particularly concerned with a combined spring and air-cushion suspension for a vehicle main frame, and is especially adapted for use in connection with air-cushions of the type shown in my Patent No. 1,216,254, dated February 13th, 1917.

The object of the present invention is to provide a simple, practical means by which the air springs can be easily applied without cutting or materially changing or modifying the frame construction. Under present practice it is necessary to saw off the forward and rearward extensions of the side sills of the body and to attach in lieu of these discarded portions special brackets or extensions for connection with the outer element of the air spring; the inner air spring element being connected to the steel spring. Such change results in a mutilation of the vehicle which is of no especial consequence except when it may be desired to remove the air springs and put them on to another car, for instance, and it is desired then to restore the vehicle to its original condition minus the air springs.

The present invention provides very simple means for applying the air springs without change in either the main frame or the usual steel springs of the vehicle.

The invention is illustrated, by way of example, in the accompanying drawings, in which—

Fig. 1 is a view in side elevation, illustrating the chassis of a vehicle and the running gear disposed therebeneath, part of said running gear being broken away to more clearly disclose the frame suspension with which the present invention is concerned.

Fig. 2 is an enlarged view in side elevation, illustrating one of the shock air cushions and the connection between it and the main frame as well as its connection with the front vehicle spring.

Fig. 3 is a section similar to that shown in Fig. 2, disclosing the rear air cushion as seen in vertical section and further illustrating its connection with the rear vehicle.

Fig. 4 is a fragmentary view in plan showing the connecting element used between the movable member of the air spring and the end of the mechanical spring.

Fig. 5 is a fragmentary view and section in elevation, showing the universal joint between the movable member of the air spring and the member shown in Fig. 5.

In the drawings, 10 represents the main frame, having the usual side sill extensions 11 and 12 which are ordinarily adapted, in the absence of the air spring mechanism herein described, for attachment to the usual semi-elliptical springs 26. The present invention has to do with the application of air springs to vehicles having this general construction.

The air spring comprises an element 15, which is adapted to be connected to the main frame, as hereinafter specified, and the movable element 17 for connection with the leaf spring 26; the part 17 having appropriate telescopic action with the part 15, all as more particularly described in my aforesaid patent. The outer element 15 has a boss 14, to the rear face of which there is secured a bracket 13, which bracket has one end bolted to the end of a horn 12 in the space where the usual shackle connects, in the absence of an air spring, while the other end of the horn has a perforated stud 13ᵃ which is adapted to bear on top of the horn 12; a bolt 20 passing through the stud and horn to effect a rigid connection. The stud 13ᵃ is cast of such length that it may be ground down so as to form not only a smooth fitting with the top of the horn 12 but to permit the adjustment of the bracket 13, with respect to the air spring and the horn, that the air spring will be in a proper vertical position. In other words, by making the stud 13ᵃ long enough, it may be cut off to any length so that the attachment will fit a horn or extension 12 of any standard configuration.

This connection of the outer element of the air spring to the main frame is substantially the same for front and rear, varying only according to the change in form of the horn projections 11 or 12. Thus Fig. 2 shows the application of the invention to the forward extension of the vehicle and Fig. 3 shows its application to the rear extension of the vehicle.

The complementary element 17 of the air spring is connected to the leaf spring 26 by the following simple attachment. A plate 21 (adapted in the case of the front spring for direct attachment at 22 to the element 17, as shown in Fig. 2, or, in case of the rear spring, for indirect attachment at 22' by means of the connecting rod 36, as shown in Fig. 3) is provided with upstanding lugs 24 adapted to embrace the eye of the leaf spring 26 and perforated for a bolt or pin 24$^a$; the rear end of the plate 21 being tied to the steel spring and braced by a U-bolt or clevis 27. In order to adapt the plate 21 readily to springs of different widths, the lugs 23 have inwardly extending studs 23$^a$ which can be trimmed or shimmed up as occasion requires.

The connecting rod 36 has a screw threaded connection with a coupling member 37, which latter is pivoted to the plate 21. The upper end of the connecting rod has a ball 35 seated in a socket 32—33 formed on a block 31 carried by the lower end of the telescoping member 17.

In operation of the present invention the vehicle and its running gear are operatively connected, as shown in Fig. 1. As the vehicle passes along a roadway it will encounter various irregularities and will receive minor and major shocks and vibrations. These vibrations will be imparted to the main frame through the medium of the front and rear springs and the air springs. It will be evident that as the front and rear axles vibrate the front and rear springs will be deflected and a portion of the vibration absorbed in these mechanical springs. Major shocks, however, will be imparted to the air springs and the mechanical and pneumatic springs will then take up the vibration and resist rebound.

It will thus be evident that by the application of combined pneumatic and mechanical springs to the front and rear ends of the vehicle a very desirable spring suspension will be produced and easy riding qualities imparted to the vehicle.

The attachments 13—13 and 21 may be made up in stock and readily adapted to any vehicle without material change. All it requires is to grind down or shim up the studs 13$^a$—13$^a$ or 24$^a$ so as properly to line up the air spring and to adjust the attachment to the particular width of the leaf spring 26. It furthermore allows air springs to be applied by ordinary skilled labor in a shop without requiring any special change or alteration in the car.

Having thus described my invention, what I claim and desire to secure by Letters Patent is—

1. The combination with a frame and axle of a vehicle and a leaf spring for supporting the frame on the axle, of a telescopic cushioning device interposed between the vehicle frame and one end of the leaf spring, and connecting means for the cushioning device including a three-point bracket rigidly connected to the vehicle frame, one point of connection of the bracket being that ordinarily used for connecting the leaf spring, the second point of the bracket adapted to be rigidly secured to the frame, and the third point of the bracket adapted to rigidly secure the cushioning device.

2. The combination with a frame and axle of a vehicle and a leaf spring for supporting the frame on the axle of a telescopic cushioning device interposed between the vehicle frame and one end of the leaf spring and connecting means between the cushioning device and leaf spring, including a plate rigidly connected to an end of the leaf spring, one point of connection being an eye formed on the end of the spring and by means of which the spring is normally connected to the vehicle frame, said plate extending from the end of the leaf spring and a pivotal connection between the plate and one member of the cushioning device, and connecting means between the head of the cushioning device and the vehicle frame, including a bracket rigidly connected to the vehicle frame, one point of connection with the bracket being that ordinarily used for connecting the leaf spring thereto.

3. The combination with a frame and axle of a vehicle and a leaf spring for supporting the frame on the axle of a telescopic cushioning device interposed between the vehicle frame and one end of the leaf spring and connecting means for the cushioning device, including a rigid connection between one element thereof and the vehicle frame and a flexible universal connection between the other element of the cushioning device and the leaf spring, the latter comprising an extension plate of the leaf spring and a pendent link pivotally connected to the extension and having a universal connection with the lower end of the cushioning device.

4. The combination with the frame and axle of a vehicle and a leaf spring for supporting the frame upon the axle of a telescopic cushioning device interposed between the frame and leaf and connecting means for the cushioning device such that the frame of the vehicle need not be mutilated, said connecting means comprising a bracket rigidly connected to the vehicle frame, one point of connection being that formerly used for connecting the leaf spring thereto, means on the bracket for supporting one member of the cushioning device immovably, and an extension plate adapted to be connected rigidly to the end of the leaf spring and a pivotal connection between the extension plate and the movable member of the cushioning device.

In testimony whereof I have hereunto set my hand in the presence of two subscribing witnesses.

LUCIEN R. GRUSS.

Witnesses:
 W. W. HEALEY,
 W. E. EWING.